Figure 1:
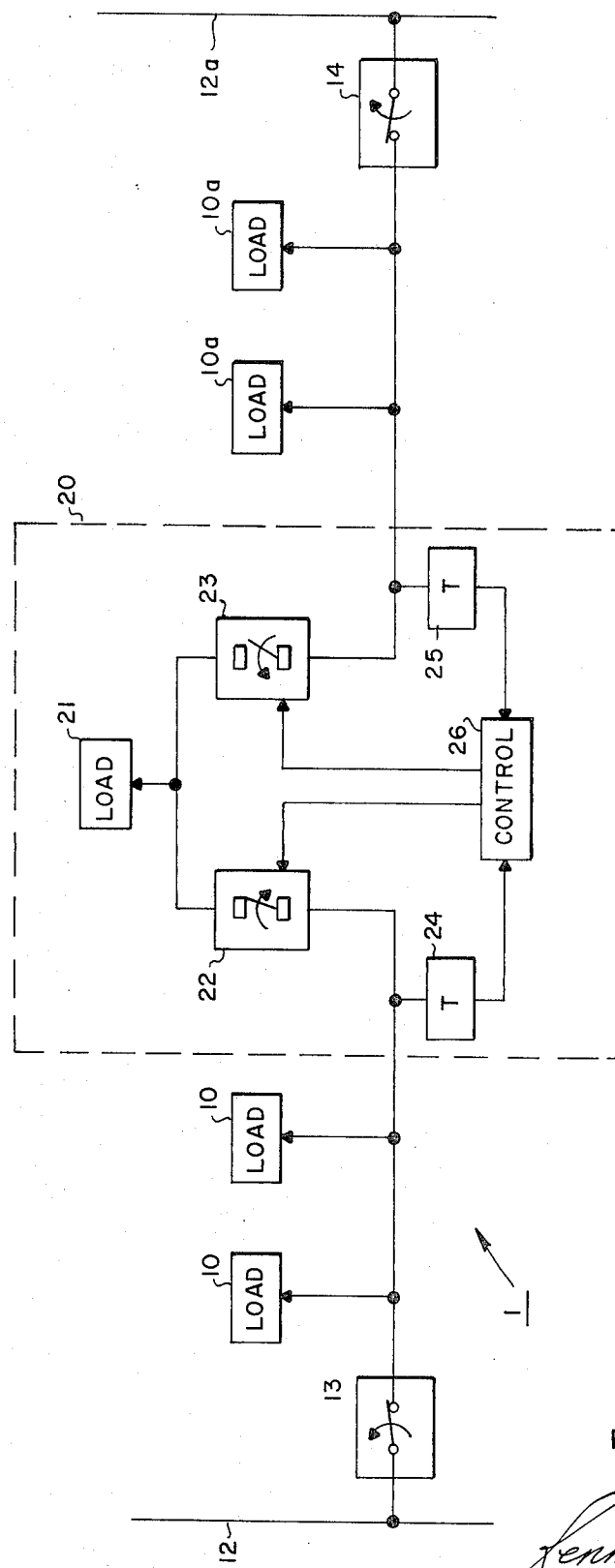

United States Patent [19]
Butcher

[11] 3,767,934

[45] Oct. 23, 1973

[54] FAULT RESPONSIVE SWITCHING SYSTEM

[75] Inventor: Robert E. Butcher, Greenville, Tex.

[73] Assignee: Esco Manufacturing Company, Greenville, Tex.

[22] Filed: June 16, 1971

[21] Appl. No.: 153,746

[52] U.S. Cl. ................................................ 307/64
[51] Int. Cl. ............................................ H02j 7/00
[58] Field of Search ................. 307/64, 66, 85, 86, 307/87, 62, 52, 43; 317/31, 54, 57, 58; 318/221 A

[56] References Cited
UNITED STATES PATENTS
2,690,485  9/1954  Swan............................ 318/221 A
3,317,741  5/1967  McClain ............................ 307/64

Primary Examiner—Herman J. Hohauser
Attorney—Kenneth R. Glaser et al.

[57] ABSTRACT

Disclosed is a fault responsive switching system adapted to transfer a load from a preferred source to an emergency source upon the occurrence of a source fault or loss of voltage, retransfer the load from the emergency source to the preferred source after correction of the fault, and to isolate the load upon the occurrence of a load fault. The switching is effected by a control network responsive to loss of voltage from the respective sources, and includes relay circuitry effective to actuate solenoids coupled to a pair of switches coupling the load to the respective sources.

6 Claims, 2 Drawing Figures

INVENTOR
ROBERT E. BUTCHER

INVENTOR
ROBERT E. BUTCHER

Kenneth R. Glaser
ATTORNEY

FAULT RESPONSIVE SWITCHING SYSTEM

This invention relates to electrical power distribution systems, more particularly to automatic switching apparatus, and even more particularly to automatic switching apparatus responsive to load and source fault conditions.

It is a widely known practice in the electrical utility industry to provide for both a preferred and emergency source of power to a load where the latter can be automatically switched to the load in the event of a failure or fault in the preferred source. Such an arrangement is often utilized in conjunction with what is referred to as "critical" loads to which it is essential that continuous power be supplied thereto. It is also widely known to couple some type of fault sensor to the load itself to automatically disconnect the load from both the preferred and the emergency source in the event of a load fault.

To date, however, the automatic switching systems that have been proposed for the above-described purposes have not been entirely satisfactory for all conditions of service. Chief among the disadvantages of the previously proposed systems is that they ordinarily require separate fault sensors coupled to the load, the preferred source, and the emergency source, and thus unnecessarily increase the complexity as well as the cost of the overall system.

It is therefore a primary object of the invention to provide a new and improved switching system for coupling and uncoupling a load to or from either a preferred or emergency source as well as disconnecting said load from both sources when a fault is associated therewith.

It is another object of the invention to provide an automatic switching system for a power distribution network where the switching system is actuated by a control network responsive to both source faults and load faults.

It is an even further object of the invention to provide a new and improved control network for selectively switching a pair of load break oil switches coupling a critical load to a preferred and emergency source of electrical power.

In accordance with these and other objects, the present invention is directed to an electrical transmission system of the type including a preferred and emergency source, a load which is adapted to be coupled to either the preferred or emergency source, and a control network for effecting this coupling in response to faults or loss of voltage associated with either source, as well as for disconnecting the load from both sources in the event of a fault associated with the load. The control network also automatically effects a retransfer or recoupling of the load after correction of the fault or loss of voltage conditions. In accordance with a preferred embodiment of the invention, the control network includes a set of relays and contacts selectively operated to energize or de-energize a pair of solenoids respectively coupled to a pair of load break switches which couple the load to the preferred or emergency sources, the control network effecting a transfer and retransfer of the load therebetween in response to the occurrence and correction of a source fault, a disconnection of the load in the event of a load fault, and the insertion of a lockout network to prevent the attempted retransfer of the load during the existence of the load fault.

Figure 2:
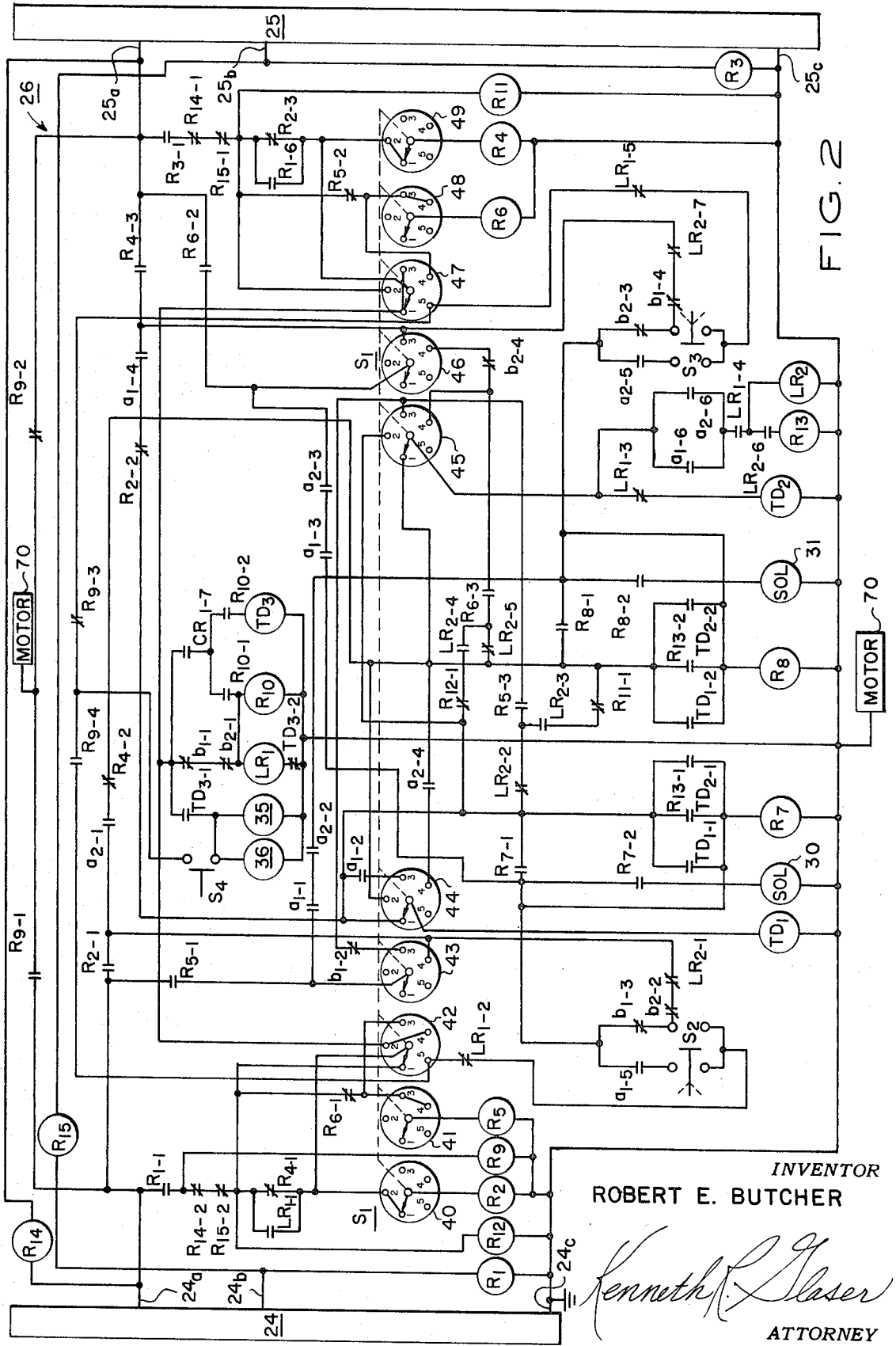

These and additional features, objects, and advantages will become apparent from the following detailed description of the preferred embodiment of the invention taken in conjunction with the accompanying drawings, wherein:

FIG. 1 is a block diagram schematic of an electrical power distribution system incorporating the present invention; and FIG. 2 is a circuit schematic of the preferred embodiment of the control network illustrated in FIG. 1.

Referring now to FIG. 1, there is depicted a power distribution system 1 utilizing the improvements of the present invention. Normally, the distribution network 1 will be part of an overall three-phase electrical transmission system, although it is contemplated that any number phase system could be utilized incorporating the present invention.

Accordingly, a plurality of loads 10, two of which are illustrated in the drawing, are coupled by way of a conventional circuit breaker 13 to a feeder cable 12; while another plurality of loads 10a, two of which are illustrated in the drawing, are coupled by way of a conventional circuit breaker 14 to a feeder cable 12a. Each of the loads 10 and 10a may be, for example, the utility service entrance of a residence or the like. Feeder cables 12 and 12a are respectively connected to voltage sources (not shown) and provide service to the loads 10 and 10a in a conventional manner well known in the art, the specific details of the coupling of the loads 10 and 10a with the system 1 therefore not being necessary for the purposes of the present invention.

In accordance with the present invention, however, a load service unit 20 is coupled, as illustrated, between the feeder cables 12 and 12a, which load service unit includes a load 21 (often referred to as a "critical" load) to which it is essential that power be maintained at all times. For example, the load 21 may be the utility service entrance of a hospital or a computer installation requiring the continuous supply of electric power thereto. To meet this requirement, the load service unit 20 is coupled to both feeder cables 12 and 12a, the voltage supply coupled to one of the cables providing the primary or "Preferred" source of power; the voltage supply coupled to the other cable providing an auxiliary or "Emergency" source in the event of a loss of power from the "Preferred" source. For the purpose of the description herein, feeder cable 12 shall be assumed to be coupled to the "Preferred" source, while feeder cable 12a shall be assumed to be coupled to the "Emergency" source. As previously mentioned, the feeder cable 12 provides the only source of power to the conventional load units 10; and the feeder cable 12a provides the only source of power to the conventional loads 10a. Thus, the terms "Preferred" and "Emergency" only have reference to the supplies to the critical load 21.

In addition to the load 21, the load service unit 20 comprises a pair of switches 22 and 23 opened and closed by a stored energy spring system (not shown) for coupling or uncoupling the load 21 to or from either the "Preferred" or "Emergency" source; as well as a fault control system comprising voltage transformers 24 and 25 and a control network 26 for effecting this coupling and uncoupling operation. The switches 22 and 23 may be of any type conventionally known in the art, but in accordance with a preferred embodiment of the invention they are of the type generally referred as "load break oil switches" manufactured and distributed, for example, by the Esco Manufacturing Company of Greenville, Texas, the assignee of the present invention.

The control network 26, the details and operation of which are subsequently described in greater detail, in combination with the transformers 24 and 25, is effective to selectively actuate the switches 22 and 23 to transfer the load 21 from the "preferred" to the "emergency" source upon a loss of voltage or the occurrence of a fault associated with the preferred source, as well as to isolate the particular load 21 from the system 1 as a consequence of a load fault associated therewith. The network 26 is also effective to return or "retransfer" the load 21 to the "preferred" source after correction of the fault or loss of voltage conditions.

There is now described the overall operation of the distribution system 1 as controlled by the control network 26. Accordingly, during the normal operation of the system, circuit breakers 13 and 14, and load break switch 22 are all closed; and load break switch 23 is open (this condition being illustrated in FIG. 1). Consequently, loads 10 and 21 are fed by way of feeder cable 12; and loads 10a are fed by way of feeder cable 12a.

Assume now a fault occurs at the "Preferred" source. As a consequence, the circuit breaker 13 opens, resulting in a loss of voltage supplied to the loads 10 and critical load 21. This loss of voltage is sensed by the transformer 24, which consequently actuates the control network 26 which, in turn, opens load break switch 22 and closes load break switch 23. As a consequence and since circuit breaker 14 remains closed, the load 21 is now coupled to and furnished power by the auxiliary or "Emergency" source associated with feeder cable 12a. This transfer of the load from the "Preferred" to the "Emergency" source will similarly occur as a result of any loss of voltage (sensed by transformer 24) associated with the "Preferred" source. After correction of the source fault or loss of voltage conditions, the load 21 will be retransferred back to the preferred source 12 and normal operation resumes.

Assume now that a fault occurs at the load 21 at a time when the system is under its normal operating conditions as illustrated in FIG. 1. Initially, and as a consequence of this load fault, the excessive current will cause the circuit breaker 13 to open, the consequent loss of voltage resulting in the opening of the switch 22 and closing of the switch 23, as before. The closing of the switch 23 will then open the circuit breaker 14 as a consequence of the load fault associated with the load 21.

After this initial cycle (referred to as "Cycle 1" below), the circuit breaker 13 is closed by a separate timing mechanism (not shown), and the resulting voltage on the line transferred by way of the transformer 24 to the control network 26 to automatically open the load switch 23. Circuit breaker 14 is then also closed by a separate mechanism (not shown). As a consequence of this cycle (referred to as "Cycle 2" below), both switches 22 and 23 are open, isolating critical load 21 from the overall system 1, while conventional loads 10 and 10a are respectively fed, as before, from the feeder cables 12 and 12a.

Thus, it is observed that the control network 26 is effective to transfer the load 21 from the "Preferred" source to the "Emergency" source in the event of a "Preferred" source fault (or loss of voltage); as well as to isolate the load 21 in the event of a load fault associated therewith. A summary of the above described operation appears in Table 1 below:

TABLE 1

|  | Circuit Breaker 13 | Circuit Breaker 14 | Switch 22 | Switch 23 |
|---|---|---|---|---|
| Normal Operation (Feeder 12 "Preferred") | Closed | Closed | Closed | Open |
| Preferred Source Fault | Open | Closed | Open | Closed |
| Load 21 Fault Cycle 1 | Open | Open | Open | Closed |
| Cycle 2 | Closed | Closed | Open | Open |

Referring now to FIG. 2, there is described the details and operation of a preferred embodiment of the control network 26. Accordingly, this network is respectively coupled to the output from the secondary of transformer 24 by way of three-phase leads 24a, 24b and 24c; and to the output from the secondary of transformer 25 by way of three-phase leads 25a, 25b, and 25c.

At the heart of the network 26 is a pair of solenoids 30 and 31, the energizing of the coils thereof opening or closing switches 22 and 23 in accordance with the desired operation of the system 1, all as subsequently described. The energizing or de-energizing of the solenoids is effected by a relay network comprising relays $R_1 - R_8$ (and associated relay contacts $R_{1-1}$, $R_{1-2}$, $R_{2-1}$, etc.); time delay relays $TD_1 - TD_2$ (and associaated relay contacts $TD_{1-1}$, $TD_{1-2}$, $TD_{2-1}$, etc.); and auxiliary switch contacts $a_1$ ($a_{1-1}$, $a_{1-2}$, etc.), $a_2$ ($a_{2-1}$, $a_{2-2}$, etc.), $b_1$ ($b_{1-1}$, $b_{1-2}$, etc.) and $b_2$ ($b_{2-1}$, $b_{2-2}$, etc.), which contacts are opened or closed in accordance with the opening and closing of switches 22 and 23. This relay network is thus effective to alternately energize or de-energize the respective solenoids 30 and 31 to (1) effect the selective switching of the switches 22 and 23 to transfer the load 21 from the preferred emergency source in the event of a preferred source fault or loss of voltage; (2) retransfer the load 21 to the preferred source after correction of the fault or loss of voltage conditions; and (3) disconnect both switches 22 and 23 in the event of a fault associated with the load 21.

As a specific feature of the controller 26, a lockout network comprising latching relays $LR_1$ and $LR_2$ (and associated contacts $LR_{1-1}$, $LR_{2-1}$, etc. and respective reset relay coils 35 and 36); relays $R_{10} - R_{13}$ (and associated contacts $R_{10-1}$, $R_{11-1}$, etc.); and time delay relay $TD_3$ (and associated relay contacts) is selectively inserted to prevent the attempted retransfer of the load 21 from the emergency source to the preferred source while the load fault is still present.

The control network 26 also includes a relay $R_9$ for selectively opening or closing contacts $R_{9-1}$ or $R_{9-2}$ to provide power to motor 70 which charges the stored energy spring system associated with the switches 22 and 23; relays $R_{14}$ and $R_{15}$ (and associated relay contacts $R_{14-1}$, $R_{14-2}$ and $R_{15-1}$, $R_{15-2}$) for preventing phase reversal during the transfer or retransfer operations of the switches 22 and 23; manual switches $S_2$ and $S_3$, the depression of which closes switch 22 or 23 respectively; and pushbutton $S_4$ for manually resetting the lockout network. A five-position selector switch $S_1$ comprising ganged wafers 40–49 enables the operator of the control network 26 to select one of five modes of operation of this network, these five modes of operation being described in greater detail below.

As a point of reference, each of the relay contacts are illustrated in FIG. 1 in their respective normally open or normally closed condition for the condition of de-energization or absence of voltage at the secondary outputs of both the transformers 24 and 25 (circuit breakers 13 and 14 thus being open). Additionally, auxiliary switch contacts $a_1$ and $a_2$ are open when switches 22 and 23, respectively, are open, and conversely will be closed when these respective switches are closed. Similarly, auxiliary switch contacts $b_1$ and $b_2$ are closed when switches 22 and 23, respectively, are open, and conversely will be open when switches 22 and 23 are closed. Thus, the condition of these switches $a_1$, $a_2$, $b_1$ and $b_2$ are illustrated in FIG. 1 assuming both switches 22 and 23 to be open.

The operation of the control network 26 is now described with respect to the various positions of the selector switch $S_1$:

Position 1, Feeder Cable 12 Preferred, Automatic Transfer and Retransfer of Load 21, Open Transition The operation of the control network 26 can initially be described when the selector switch $S_1$ is in the position 1 illustrated in FIG. 2. Assume initially that the system 1 (FIG. 1) is in the normal operating mode, i.e., circuit breakers 13 and 14 are closed, switch 22 is closed, and switch 23 is open. Under such conditions, relay contact $R_{1-1}$ is closed, and relay contact $R_{2-3}$ is open. Relay contacts $R_{14-1}$, $R_{14-2}$, $R_{15-1}$, and $R_{15-2}$ are closed and will remain closed throughout the entire operation, assuming no phase reversal. As a consequence, relay $R_2$ is energized ("operated") and relay $R_4$ is de-energized ("restored").

On the occurrence of either a fault at the load 21 or fault associated with the preferred source or feeder 12, circuit breaker 13 opens. The consequent loss of voltage is transmitted by way of transformer 24 to de-energize relays $R_1$ and $R_2$, thus opening relay contact $R_{1-1}$ and closing relay contact $R_{2-3}$. Since relay contacts $R_{3-1}$, $R_{14-1}$, and $R_{15-1}$ are already closed, thus will energize relay $R_4$.

Actuation of relay $R_4$ closes contact $R_{4-3}$ (relay contact $R_{2-2}$ and auxiliary contact $a_{1-4}$ being closed), and time delay relay $TD_1$ will consequently be energized. At the end of the timing cycle of $TD_1$, relay contact $TD_{1-1}$ closes, thus picking up or actuating relay $R_7$. As a consequence of the actuation of relay $R_7$, relay contacts $R_{7-1}$ and $R_{7-2}$ are closed, thus energizing the coil of solenoid 30, thereby to open switch 22.

The opening of switch 22 results in the opening of all $a_1$ contacts and the closing of all $b_1$ contacts. As a consequence, solenoid 30 is de-energized, and latching relay $LR_1$, relay $R_{10}$, relay $TD_3$, and relay $R_8$ are picked uo.

Actuation of relay $R_8$ closes the appropriate relay contacts $R_{8-1}$ and $R_{8-2}$, thus resulting in the energizing of solenoid 31, thereby to close switch 23. Closing of the switch 23 then opens contacts $b_2$ to de-energize solenoid 31 and $a_2$ contacts close.

At this point in time, the switch 22 is open, the switch 23 is closed, and if the fault is associated with the preferred source or feeder cable 12, rather than the load 21, the circuit breaker 14 remains closed, and the load 21 is transferred to emergency auxiliary feeder cable 12a. Relay $TD_3$ would complete its timing cycle to close relay contact $TD_{3-1}$ and thus energize coil 35 to reset the lockout circuit.

After correction of the preferred source fault, circuit breaker 13 is closed, thus actuating relay $R_2$ and dropping out relay $R_4$. As a consequence, retransfer time delay relay $TD_2$ picks up and after completing its timing cycle, closes its associated contacts (particularly $TD_{2-2}$) to pick up relay $R_8$. Actuation of relay $R_8$ thereafter closes its associated contacts (particularly $R_{8-1}$ and $R_{8-2}$) to energize solenoid 31, thus opening switch 23. As a consequence of switch 23 opening, $a_2$ contacts open to de-energize solenoid 31, and the $b_2$ contacts close to acutate relay $R_7$. Actuation of relay $R_7$ therefore closes its associated contacts (particularly $R_{7-2}$), thereby to energize solenoid 30 and close switch 22. The $b_1$ contacts are thereby opened, the $a_1$ contacts are closed, and solenoid 20 is de-energized. As a consequence of the just-described operation, the load 21 will be retransferred from the emergency feeder 12a back to the primary or preferred feeder 12, and system 1 is again returned to its normal operation.

If the fault, however, is at the load 21, the closing of the switch 23 would result in the opening of circuit breaker 14. This consequent loss of voltage is transmitted by way of the transformer 25 to de-energize timing relay $TD_3$, thus preventing it from completing its timing cycle. This results in a consequent insertion of the lockout circuit network and prevents the subsequent reclosing of switch 22 and an attempted retransfer operation.

With the control circuit 26 thus in the electrical lockout position, circuit breaker 13 is closed, by an appropriate external timing mechanism (not shown) for example. The relay $R_{13}$ is thus energized, closing contact $R_{13-2}$, thereby to energize relay $R_8$ and close contacts $R_{8-1}$ and $R_{8-2}$, thereby energizing solenoid coil 31, to open switch 23.

As a consequence of the opening of switch 23, the load 21 is therefore isolated, but the conventional loads 10 and 10a are still fed from the feeder cables 12 and 12a, respectively, the external timing mechanism that previously closed breaker 13 also closing breaker 14 after switch 23 is opened.

POSITION 5, MANUAL OPERATION

After the load fault is corrected, the switches 22 and 23 are returned to their normal operating position as illustrated in FIG. 1. To effect this condition, however, the lockout network must be reset. This is accomplished by moving the selector switch $S_1$ to position 5, and thereafter depressing fault reset pushbutton $S_4$. This will then result in emergizing the coils 35 and 36 to reset relays $LR_1$ and $LR_2$, respectively, the operation of which removes the lockout network from the circuit 26. Depression of manual switch $S_2$ then energizes solenoid coil 30 to close switch 22. (If switch 23 is to be closed when the preferred feeder is 12a, switch $S_3$ would be manually depressed to actuate solenoid coils 31.) The selector switch $S_1$ can then be returned to the position 1, and the system is thus returned to the condition illustrated in FIG. 1, and is ready for noraml operation.

Position 2, Feeder Cable 12a Preferred, Automatic Transfer and Retransfer of Load 21, Open Transition With the selector switch $S_1$ in the position 2, the operation of the network 26 is similar to that described above, the difference being that the relay network now serves to move the switch 23 from its normally closed position to an open position and the switch 22 from its normally open position to a closed position, thereby to transfer the load 21 from what is now the preferred feeder source 12a to what is now the emergency feeder source 12. Since the operation is similar to that described above, it is not necessary to repeat the description of the operation at this time since it will be apparent to one ordinarily skilled in the art.

Position 3, Feeder Cable 12 Preferred, Automatic Transfer and Retransfer of Load 21, Closed Transition With the selector switch $S_1$ in the position 3, the operation of the network 26 is identical to that described with respect to the operation of the network when selector $S_1$ is in the position 1 with the exception that relays $R_5$ and $R_6$ respectively take the place of relays $R_2$ and $R_4$. Additionally, however, during the retransfer operation, the relay $R_8$ contacts will close after the relay $R_7$ contacts close, thus energizing solenoid 30 prior to energizing solenoid 31. As a consequence, both switches 22 and 23 will be simultaneously closed during the retransfer operation, thus preventing any interruption of service to the load 21 during this retransfer.

Position 4, Feeder Cable 12a Preferred, Automatic Transfer and

Retransfer of Load 21, Closed Transition

With the selector switch $S_1$ in the position 4, the operation of control network 26 will be similar to that when the selector switch $S_1$ is in the position 3, with the exception that the relays will operate to selectively close and open the switches 22 and 23 taking into consideration that feeder cable 12a is now the preferred source.

Various modifications to the disclosed embodiment, as well as alternate embodiments of the present invention may become apparent to one skilled in the art without departing from the spirit and scope of the invention as defined by the appended claims.

What is claimed is:

1. An electrical transmission system, comprising:
    a. first and second sources of electricity,
    b. first and second loads,
    c. a critical load disconnectably coupled to said first and second loads,
    d. said first and second sources respectively providing electrical power to said first and second loads, and also providing the preferred and emergency source of electrical power to said critical load, and
    e. means for selectively switching said critical load from connection with said preferred source to connection with said emergency source when a fault occurs at said preferred source, said switching means also switching said critical load from connection from both the preferred source and the emergency source when a fault occurs at said critical load to thereby isolate said critical load from said first and second sources and said first and second loads, said first and second sources providing electrical power to said first and second plurality of loads during said isolation, said switching means effecting said isolation of said critical load by initially switching said critical load from connection with said preferred source to connection with said emergency source in response to said critical load fault and thereafter switching said ciritcal load from connection with said emergency source.

2. An automatic switching system to be incorporated in an electrical power distribution system of the type including a preferred source, an emergency source, and a load, said switching system comprising:
    a. switch means for alternatively coupling said load between said preferred source and said emergency source;
    b. control means responsive to a loss of voltage from said preferred source to actuate said switch means to automatically uncouple said load from said preferred source and transfer said load to said emergency source, said control means also being responsive to restoration of voltage from said preferred source to automatically uncouple said load from said emergency source and retransfer said load to said preferred source, and also being responsive to a fault in said load to uncouple said load from both the preferred and emergency source; and
    c. means coupled to said control means and said preferred and emergency source for actuating said control means solely in response to a loss of voltage from said sources.

3. The system as defined by claim 2 wherein said switch means comprises a pair of switches respectively coupled between said preferred and emergency sources, and wherein said control means comprises a pair of solenoids respectively coupled to said switches for operating said switches.

4. The system as defined by claim 3 wherein said control means includes a relay network for selectively energizing said solenoids, and further including a lockout network for preventing the retransfer of said load during the presence of a load fault.

5. The system as defined by claim 4 wherein said pair of switches are load break oil switches.

6. Electrical switching system for an electrical power distribution system of the type including a preferred source, an emergency source, and a load, said switching system comprising:
    a. first and second circuit breakers respectively coupled to said preferred and emergency sources,
    b. first and second switches respectively coupled between said first and second circuit breakers and said load, and
    c. control means having a pair of inputs and a pair of outputs, said inputs respectively coupled to said first and second circuit breakers by way of first and second voltage transformers, respectively; said pair of outputs being respectively coupled to said first and second switches,
    d. said control means being responsive to a loss of voltage from said preferred source sensed by said first voltage transformer to open said first switch and close said second switch, thereby to transfer said load from said preferred source to said emergency source,
    e. said control means also being responsive, in conjunction with said first and second circuit breakers, to open said first and second switches in response to a fault in said load, thereby to isolate said load from both the preferred and emergency sources.

* * * * *